Nov. 30, 1965  F. LEBOWSKY  3,220,270
APPARATUS FOR THE DISPLACEMENT OF THE POSITION
OF A STRUCTURE ELEMENT
Filed Oct. 14, 1963  2 Sheets-Sheet 1

INVENTOR
FRITZ LEBOWSKY
BY

ATTORNEY.

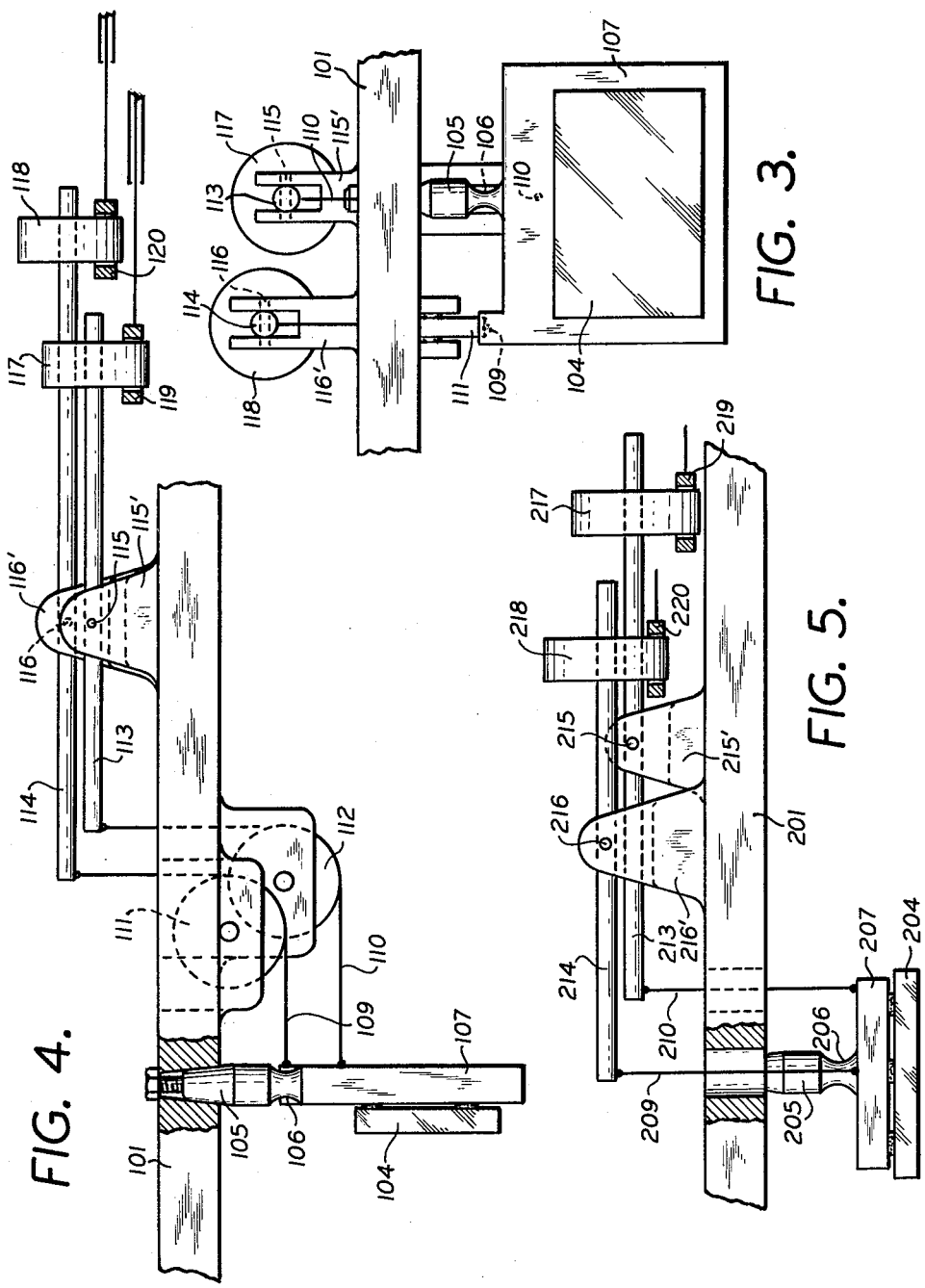

United States Patent Office 3,220,270
Patented Nov. 30, 1965

3,220,270
APPARATUS FOR THE DISPLACEMENT OF THE POSITION OF A STRUCTURE ELEMENT
Fritz Lebowsky, Egerer, Chieming, Upper Bavaria, Germany, assignor to Wenczler & Heidenhain, Traunreut, near Traunstein, Upper Bavaria, Germany, a corporation of Germany
Filed Oct. 14, 1963, Ser. No. 316,039
4 Claims. (Cl. 74—108)

The present invention relates to an apparatus for the displacement of the position of a structure element by small steps with an elastic, yet relatively rigid support for the structure element and an adjustment member which, depending upon its position, is capable of exerting finely stepped up, different forces upon the structure element.

In a known device of this type the structure element to be adjusted is supported by a bendable short pin, the adjustment number being a screw which depending upon its adjustment compresses a helical spring more or less and causes the helical spring to exert pressure on the structure element, so that the supporting pin is elastically bent and the structure element changes its position.

This known device permitted already to change the position of the structure element in a very sensitive manner, yet it has still the essential disadvantage, that an adjustment once obtained is not retained permanently. First of all, at temperature changes the effect of the helical spring does not remain constant. In devices, in which structure elements capable of extremely fine adjustability are required, usually an extremely equal room temperature has to be maintained. Yet even in this case, however, during the adjustment by hand the body heat and after such adjustment the lacking of the body heat, respectively, is so strongly effective, that it is practically impossible to adjust the structure element such, that it maintains exactly its position upon withdrawal of the attending person. In this manner, it is possible only with great skill and experience to consider the probable effect of the temperature change already during the adjustment, so that the final position of the structure element, that is the position assumed after complete temperature balance, corresponds with the intended position. Yet, even then, it is not sure in the known devices that by another disturbance, for example a shaking, a constant position change is not caused.

It is, therefore, one object of the present invention to provide an apparatus for the displacement of the position of a structure element by small steps wherein the drawbacks of the known devices are avoided and which is designed such that the position once adjusted is maintained to the greatest extent, is substantially independent from temperature influences and returns into its original position after being subjected to disturbances by other causes, for example, by shakings.

It is another object of the present invention to provide an apparatus for the displacement of the position of a structure element by small steps wherein an elastic yet relatively rigid support for the structure element and an adjustment member are arranged, which adjustment member is capable of exerting finely graduated, different forces upon the structure element depending upon the position of the adjustment member. Deviating from the known devices, however, the adjustment member is a weight, which is slidably mounted on a horizontal lever, which in turn is connected with the structure element by a force transmitting element and moreover the weight is, at least after completed adjustment, freely disposed.

A displacement of the weight on the lever changes the ratio between the lever arms so that here, similar to the known device, different forces are exerted upon the structure element. The graduation of these forces depends substantially upon the fact, what smallest possible displacement of the weight on the lever can be performed and how long the total possible sliding path of the weight is on the lever. It is apparent, that any selected fine step-up can be brought about by a corresponding length of the lever. This represents an additional advantage over the known device. It is essential thereby, that the lever ratio is not varied by temperature changes, since the individual effective lengths of the lever, but not their ratio is changed by a heat expansion of the lever. Also, the force exerted upon the structure element is dependent substantially only upon the adjusted lever ratio, so that even after a momentary deviation, for example by shaking, the previous position of the total device and, thereby, of course, also that of the structure element is restored.

With these and other objects in view which will become apparent in the following detailed description, the present invention will be clearly understood in connection with the accompanying drawings, in which:

FIG. 3 is a front elevation of a second embodiment of the apparatus designed in accordance with the present invention;

FIG. 4 is a side elevation of the apparatus disclosed in FIG. 3; and

FIG. 5 is a side elevation of a third embodiment of the apparatus designed in accordance with the present invention.

Figure 1:
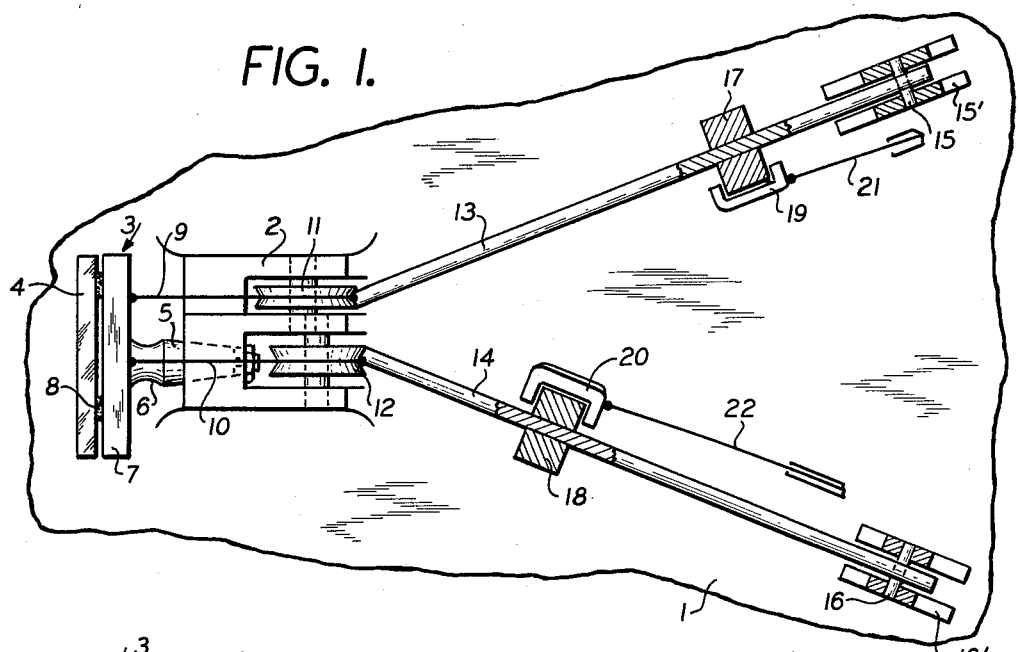
FIGURE 1 is a top plan view of an apparatus designed in accordance with the present invention.
Figure 2:
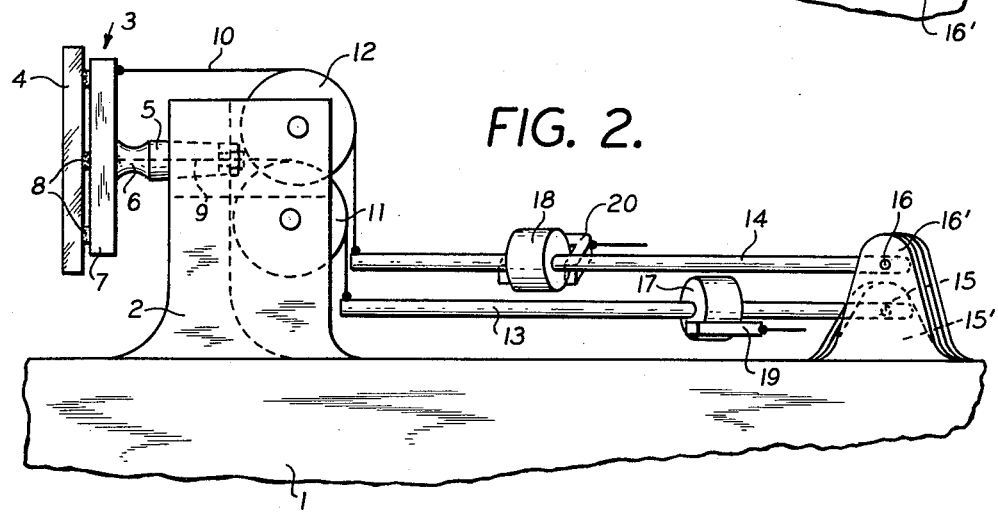
FIG. 2 is a side elevation of the apparatus shown in FIG. 1.

Referring now to the drawings, and in particular to FIGS. 1 and 2, the apparatus comprises a base plate 1 having a post-shaped upright 2. A support 3 for a structure element 4 is rigidly connected to upright 2. The support 3 includes a pin 5 which has a narrowed portion 6 and a securing plate 7 for the structure element 4. The latter, for example a mirror of an interference arrangement, is secured to the securing plate 7 by means of three elastic gluing points 8. Two threads 9 and 10 originate from the securing plate 7 whereby one thread 9 is disposed laterally relative to the pin 5 and the other thread 10 is disposed vertically above the pin 5. The threads 9 and 10 are guided about two deflection rollers 11 and 12, which are mounted with little friction in the upright 2, and are connected with their opposite end with the end of a lever 13 and 14, respectively. The levers 13 and 14 are pivotally mounted on pivots 15 and 16, respectively, which pivots 15 and 16 find their support in mountings 15' and 16' secured to the base plate 1. Weights 17 and 18 are slidable disposed on the levers 13 and 14.

The displacement of one of the weights 17 and 18, respectively, causes a variation of the force exerted upon the corresponding thread 9 and 10, respectively. This variation of the exerted force brings about in turn a bending of the pin 5 substantially at the narrowed portion 6 thereof, so that a force variation at the thread 9 causes a rotation of the structure element 4 about a vertical axis, and a force variation at the thread 10 causes a rotation of the structure element 4 about a horizontal axis. A tractive force of the thread, which is once adjusted, is always retained at a constant value, since it depends only upon the ratio of the effective lengths of the arms of the levers 13 and 14.

The weights 17 and 18 are gripped by forks 19 and 20 which are displaceable from a service station situated in a predetermined distance by means of a Bowden cable 21 and 22, respectively. It is essential thereby, that the forks 19 and 20 have so much play that the attendant is able to displace the forks 19 and 20, respectively, upon completed adjustment, into a position, in which they have no contact at all with the weights 17 and 18 respectively, so that the weights 17 and 18 are freely disposed on the levers 13 and 14. Any temperature variations, which could still occur after the adjustment, cannot have the effect, that the weights 17 and 18, respectively, change their positions on the levers 13 and 14, respectively.

Referring now to FIGS. 3 and 4, which disclose another embodiment of the apparatus, the structure element 104 to be adjusted is secured to a securing plate 107, the pin 105 of which, contrary to the first embodiment, is not horizontally mounted, but vertically suspended from a base plate 101. The two threads 109 and 110 engage again the securing plate 107 at points laterally and vertically, respectively, relative to the narrowed portion 106 of the pin 105. Upon exerting a pulling force on the thread 110, the narrowed portion 106 of the pin 105 is again subjected to a bending action, and by a pulling force on the thread 109, however, it is subjected to a torsional force. The threads 109 and 110 are guided again about deflection rollers 111 and 112 and their free ends are secured to levers 113 and 114, which are pivotally mounted on pivots 115 and 116 supported by the base plate 101. The slidable weights 117 and 118 are gripped also by remote controlled forks 119 and 120 having sufficient play so that upon completed adjustment, the weights 117 and 118 can be freely disposed on the levers 113 and 114.

Referring now again to the drawings, and in particular to FIG. 5, a third embodiment of the apparatus is disclosed which follows in principle the second embodiment. It comprises, however, a structure element 204, which is to be turned about two horizontal axes extending about through the center of the narrowed portion 206 of the vertical pin 205 which two horizontal axes are disposed substantially perpendicularly relative to each other. The threads 209 and 210, secured to a horizontally disposed securing plate 207, can be guided directly vertically upwardly without the use of deflection rollers through the base plate 201 and be secured to the levers 213 and 214. The levers 213 and 214 are pivotally mounted on pivots 215 and 216, supported by respective mountings 215' and 216', and carry slidably the weights 217 and 218 which are in turn gripped by forks 219 and 220 to be operated in the manner disclosed in the previous embodiments.

While I have disclosed three embodiments of the present invention, it is to be understood that these embodiments are given by example only and not in a limiting sense, the scope of the present invention being determined by the objects and the claims.

I claim:
1. An apparatus for the adjustment of the position of a structure element by movement of the latter for small amounts, comprising
   a base plate,
   a support carried by said base plate and being adapted to removably support a structure element,
   means for bendably and substantially rigidly securing said support to said base plate,
   adjustment means disposed on said base plate and exerting finely graduated different forces on said support and, thereby, on said structure element, in response to the respective positions of said adjustment means,
   said adjustment means comprising at least one weight,
   a substantially horizontally disposed lever pivotally mounted on said base plate,
   said weight being slidably mounted on said lever,
   force transmitting means disposed between said lever and said support, and
   said weight being freely disposed on said lever at least upon termination of the adjustment operation of said weight on said lever.

2. The apparatus, as set forth in claim 1, wherein
   said force transmitting means are directed toward said support in a direction other than the vertical direction, and
   said force transmitting means comprises an element transmitting pulling forces only substantially vertically from said lever, and
   a deflection roller rotatably mounted on said base plate, and
   said deflection roller receiving said element and changing the direction of said pulling forces from their substantially vertical direction into any predetermined direction.

3. The apparatus, as set forth in claim 1, wherein
   said force transmitting means are directed toward said support substantially in vertical direction, and
   said force transmitting means comprises an element transmitting pulling forces only substantially vertically from said lever directly to said support.

4. The apparatus, as set forth in claim 1, which includes
   means for displacement of said weight on said lever comprising a fork gripping said weight with play and movable along said lever,
   such that said fork does not engage said weight upon termination of the adjustment operation of said weight on said lever.

References Cited by the Examiner
UNITED STATES PATENTS
2,993,404  7/1961  Rouy _____ 88—14

BROUGHTON G. DURHAM, *Primary Examiner.*